US005809436A

United States Patent [19]

Gregory

[11] Patent Number: 5,809,436

[45] Date of Patent: Sep. 15, 1998

[54] AUTOMATIC THROTTLE ADJUSTOR

[76] Inventor: John W. Gregory, 453 Union St., Nazareth, Pa. 18064

[21] Appl. No.: 588,628

[22] Filed: Jan. 19, 1996

[51] Int. Cl.[6] ............................ B63H 21/28; B60K 41/00

[52] U.S. Cl. .............................. 701/21; 701/99; 701/112; 440/85; 440/87; 123/339.1

[58] Field of Search ..................... 364/424.025, 424.098, 364/431.03, 431.09, 431.1; 440/1, 85, 87; 417/17, 34; 123/339.1, 339.28, 398, 360, 413

[56] References Cited

U.S. PATENT DOCUMENTS

| | | | |
|---|---|---|---|
| 586,893 | 7/1897 | Bittner | 137/42 |
| 1,678,714 | 7/1928 | Sperry | 440/122 |
| 1,927,923 | 9/1933 | Dean | 115/1 |
| 3,806,279 | 4/1974 | Oswald | 417/12 |
| 4,100,877 | 7/1978 | Scott et al. | 440/1 |
| 4,505,045 | 3/1985 | Stocker | 33/655 |
| 4,643,149 | 2/1987 | Dunham et al. | 123/403 |
| 4,940,433 | 7/1990 | Raber | 440/1 |
| 5,074,810 | 12/1991 | Hobbs et al. | 440/2 |
| 5,118,315 | 6/1992 | Funami et al. | 440/1 |
| 5,142,473 | 8/1992 | Davis | 364/424.025 |
| 5,190,487 | 3/1993 | Fukui | 416/25 |
| 5,203,727 | 4/1993 | Fukui | 440/1 |
| 5,242,320 | 9/1993 | Schmidt et al. | 440/86 |
| 5,261,844 | 11/1993 | Shibata | 440/87 |
| 5,481,261 | 1/1996 | Kanno | 340/870.16 |
| 5,606,852 | 3/1997 | Kanno et al. | 123/413 |

*Primary Examiner*—Tan Q. Nguyen
*Attorney, Agent, or Firm*—Pearne, Gordon, McCoy & Granger LLP

[57] ABSTRACT

An automatic throttle adjustor system for a power boat which is operable to return a carburetor throttle valve to an idle setting from a user-selected setting when a sensor mounted on a bottom of the boat is about to leave the water, and which is operable to return the throttle valve to the user selected setting from the idle setting when the sensor is again submerged in the water. The system includes the sensor, a controller, an actuator, and a throttle linkage. The sensor supplies signals to the controller indicative of whether the sensor is submerged or airborne. The controller uses the signals supplied by the sensor to switch the actuator between a normal, activated state, in which the throttle valve is at the user-selected setting, to a deactivated state, in which the throttle is moved to the idle setting. The throttle linkage includes an element which is in a first position when the actuator is in the activated state and which moves to a second position when the actuator is deactivated. Switching of the actuator between the activated and deactivated states moves the element between the first and second positions and, accordingly, moves the throttle valve between the user-selected setting and the idle setting.

15 Claims, 4 Drawing Sheets

AUTOMATIC THROTTLE ADJUSTOR

BACKGROUND OF THE INVENTION

1. Field of the Invention

The present invention generally relates to throttle adjustors and, more particularly, to automatic throttle adjustors for power boats.

2. Description of Related Art

During the development of power boat controls, there have been several attempts to automate the adjustment of the throttle and the till to provide improved or more efficient operation of the boat during varying water conditions which the boat typically experiences. Some of the automatic adjustment devices developed, as evidenced by the patent art, relate to devices which attempt to maintain the boat level during acceleration. Other automatic adjustment devices are designed to prevent over-acceleration of the boat, which may cause cavitation of the boat's propulsion screw, and resulting unloading and racing of the boat's engine, and possible damage to the engine and drive line.

U.S. Pat. No. 586,893 discloses a system for cutting steam power to a ship's propellers when the propellers leave the water. The system includes an open-ended cylinder in communication with the water beneath the boat, and having a piston which is connected to the steam power supply via a linkage. When the open end of the cylinder is withdrawn from the water, the piston moves downwardly which actuates the linkage and a valve to cut off power to the propellers. When the open end of the cylinder is again submersed in water, the piston moves upwardly and, via the linkage, opens the valve to provide steam power to the propellers. The '893 patent also discloses an alternate embodiment (FIG. 7, page 2, lines 30–67) wherein movement of the piston closes electrical contacts to actuate a motor and thereby control opening and closing of the steam valve.

U.S. Pat. No. 5,190,487 discloses a system for preventing cavitation of a propulsion screw to improve acceleration response of the boat. The system includes a speed limiter which determines, based upon a signal from a bubble sensor, whether the amount of bubbles generated from the screw exceeds a predetermined value. The bubble sensor may be a capacitance sensor that senses a change in capacitance between electrodes. The bubble sensor is apparently located within the stream of bubbles emanating from the propulsion screw, and therefore is mounted behind the propulsion screw.

U.S. Pat. No. 1,927,923 discloses a system for controlling the backing speed of a boat. The system provides an open ended cylinder in which a piston is slidably mounted. A push rod extends from the piston, the push rod and piston being spring biased to an outward at rest position. When the water pressure within the cylinder exceeds a predetermined maximum indicative of backing speed greater than a desired maximum, the water pressure forces the piston and push rod inwardly against the spring bias and actuate a control lever to reduce power from the engine.

U.S. Pat. No. 4,100,877 discloses a control system for a water-jet propelled boat which responds to sensed pressure in a water inlet passage. The control system includes a pressure sensor at the inlet passage, and electronics to energize a relay to override manual throttle control and effectively places the throttle in an idle position should the sensed pressure at the inlet indicate that the inlet is not submerged. When the sensed pressure is indicative of the inlet being again submerged, the relay is de-energized, and control of the throttle is returned to the user. The control system prevents unloading and overspeed of the prime mover.

U.S. Pat. No. 5,074,810 discloses a speed control system which uses a pitot tube and a pressure transducer, with associated electronics and throttle controls to maintain the boat at a user-selected speed. See also, U.S. Pat. No. 5,142,473, which discloses a control system for speed, acceleration, and trim.

In high performance water craft, there is a tendency for the boat to become airborne due to rough water conditions and the high speeds at which the boat operates. If the boat becomes airborne, the propulsion screw is unloaded, and the engine and/or drive train may be damaged. Therefore, there exists a need in the art for a system which will sense when the boat is about to leave the water and which automatically controls the throttle to prevent racing of the engine. There also exists a need in the art for a control system which will minimize the risk of boats becoming airborne.

SUMMARY OF THE INVENTION

In accordance with the present invention, an automatic throttle adjustor system is operable to automatically return a carburetor throttle valve to an idle setting under conditions when it is determined that the boat's propulsion screw is about to leave the water to minimize the chance of the propulsion screw being unloaded, which would result in racing of the engine and possible damage to the engine and drive train.

In further accordance with the present invention, an automatic throttle control system for a power boat includes a sensor mounted to lower surface of the boat, a carburetor throttle valve actuator mounted to a carburetor and operably connected to a throttle valve, an actuator operable to return the carburetor throttle valve actuator from the user-selected setting to the idle setting, and a controller which receives a signal from said sensor.

In further accordance with the present invention, the throttle valve actuator is movable to any one of a plurality of user-selected settings between an idle setting and a full-throttle setting and, when the signal from the sensor to the controller is at predetermined value, the controller activates the actuator to return the carburetor throttle valve actuator to the idle setting.

In further accordance with the present invention, the actuator includes a valve and a pneumatic member. The pneumatic member includes a piston, a cylinder, and a mounting bracket. The piston is movable within the cylinder from a first, retracted position to a second, extended position. The piston includes a rod which is secured to the carburetor throttle valve actuator. The valve, when in a first, open position permits the flow of compressed air from an air compressor to the cylinder to retain the piston in the retracted position and, when in a second, closed position cuts-off the flow of compressed air from the compressor to the cylinder and vents compressed air from the cylinder to atmosphere to permit the piston to move from the retracted position to the extended position under the influence of a biasing means. Movement of the piston from the retracted to the extended positions returns the carburetor throttle valve actuator to the idle position.

In further accordance with the present invention, the system includes a manual throttle controller and a throttle linkage. The throttle linkage operably links the manual throttle controller and the throttle valve actuator and includes a throttle linkage rod and the pneumatic member.

In further accordance with the present invention, the manual throttle controller is movable by an operator to a user-selected position between an idle position and a full throttle position. Movement of the manual throttle controller to the user-selected position is transferred to the carburetor throttle valve actuator by the throttle linkage to place the carburetor throttle valve actuator in the user-selected setting.

In further accordance with the present invention, the throttle linkage includes a movable inner actuating rod and a stationary outer sheath. The inner actuating rod is attached to the mounting bracket, and is moved by the manual throttle controller to any user-selected position between the idle position and the full throttle position. The mounting bracket is slidably mounted to the outer sheath, and moves laterally with the actuating rod relative to the outer sheath.

In further accordance with the present invention, a method for automatically adjusting a throttle of a power boat includes supplying signals from a sensor to a control device, interpreting the signals to determine whether the sensor is submerged, and, if the sensor is not submerged, returning the carburetor throttle valve actuator to an idle setting.

In further accordance with method of the present invention, if the sensor is not submerged, and the throttle has been returned to the idle setting, then the signals from the sensor are interpreted to determine whether the sensor is submerged and, if the sensor is submerged, the carburetor throttle valve is returned to the user-selected position.

BRIEF DESCRIPTION OF THE DRAWINGS

These and further features of the present invention will be apparent with reference to the following description and drawings, wherein.

DETAILED DESCRIPTION OF THE PREFERRED EMBODIMENT

Initially, it is noted that, in order to clearly and concisely disclose the present invention, the drawings may not necessarily be to scale and certain features of the invention may be shown in somewhat schematic form.

Figure 6:
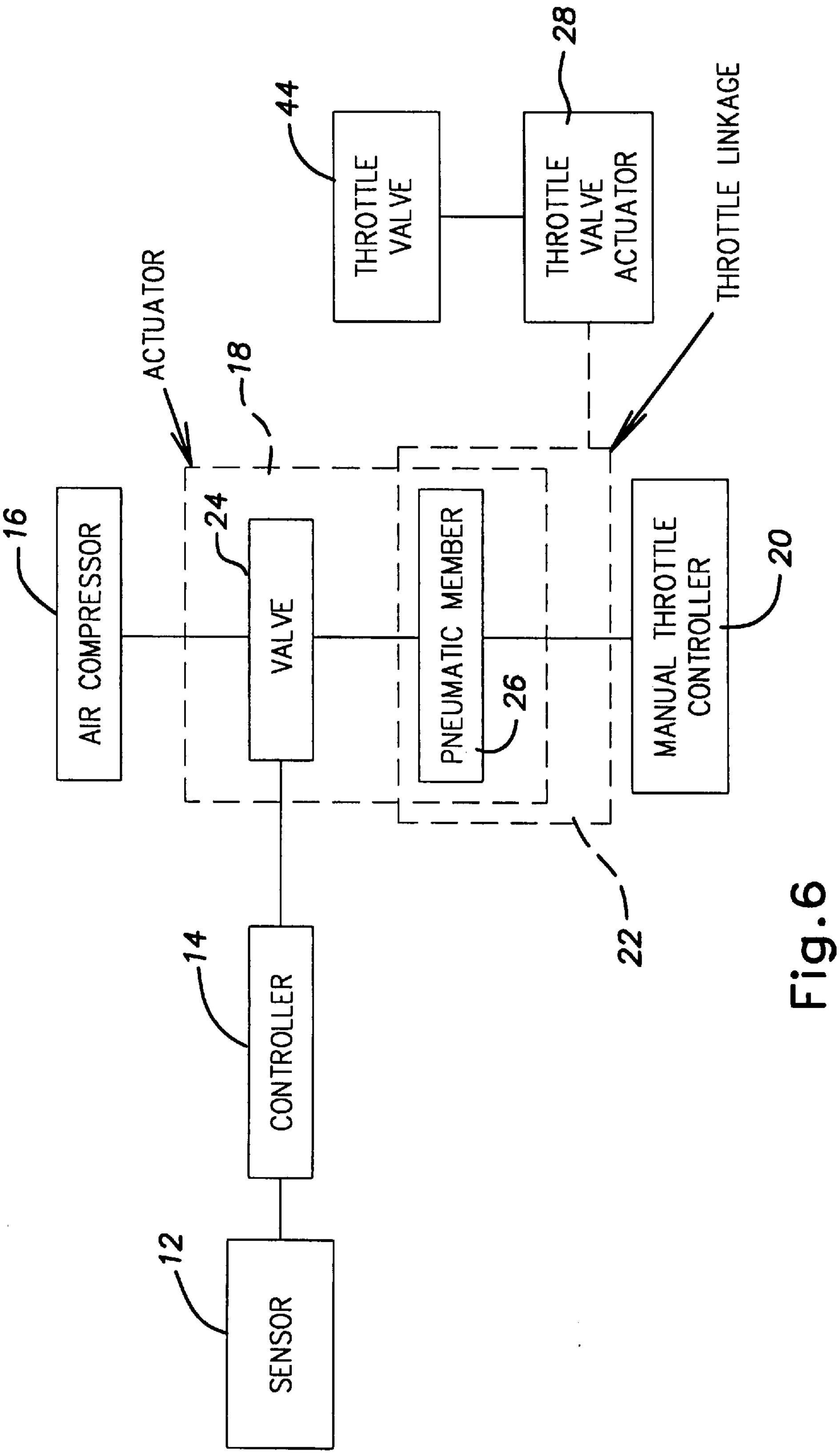
FIG. 6 is a schematic illustration of an automatic throttle adjustor system according to the present invention.

With reference to FIG. 6, an automatic throttle adjustor system 10 according to the present invention is schematically illustrated. The system 10 is described herein as being used on a power boat, but may also have application to various other types of vehicles. The system 10 generally includes a sensor 12, a controller 14, an air compressor 16, an actuator 18, a manual throttle controller 20, and a throttle linkage 22.

The sensor 12 is preferably mounted to a bottom surface of the boat (i.e., the hull or transom) at a predetermined location forward of the propulsion screw (not shown). More preferably, the sensor 12 is located at a position which is between about six to about sixteen inches in front of the propulsion screw. Since the propulsion screw extends downwardly from the boat, the sensor 12 is also located relatively above the propulsion screw.

The exact position of the sensor 12 relative to the propulsion screw will depend upon various factors, such as the shape and length of the boat hull and the maximum operating speed of the boat. For example, on a boat designed to move at a very high maximum speed, the sensor 12 may be mounted farther forward, relative to the propulsion screw, than on a boat which is designed to travel at a relatively slower maximum speed.

The sensor 12 is preferably a capacitance-type sensor having a pair of spaced-apart plates which use the fluid in which the boat is located as the dielectric medium. An output current signal supplied to the controller 14 by the sensor 12 will vary between a first value when the sensor 12 is completely submerged (and water is the dielectric medium) and a second value when the sensor 12 is completely airborne (and air is the dielectric medium).

The current signals supplied by the sensor 12 are interpreted by the controller 14, which activates and deactivates the actuator 18. Preferably, the controller 14 activates the actuator 18 when the current signal supplied by the sensor 12 is at the second level indicative of the sensor 12, and hence the portion of the boat on which the sensor 12 is mounted, being airborne. The sensor being airborne is an indication that the propulsion screw is about to come out of the water, which may result in damage to the various components of the boat drive train and engine. The controller 14 deactivates the actuator 18 when the current signal supplied by the sensor 12 is indicative of the sensor 12 being again submerged in water.

The controller 14 provides a capacitance sensitivity or calibration function whereby, each time the controller 14 is activated, the current signal from the sensor 12 is read by the controller 14 and used as a set point (first value) for subsequent calculations, i.e., for determining the second value of the current signal corresponding to the sensor 12 being airborne.

Such calibration is desirable as the dielectric constant, and hence the first value or set-point current supplied by the sensor 12, corresponds to the chemical make-up of the fluid or water in which the boat is submerged, and will therefore be affected by a number of factors, such as the salinity of the water, and the chemicals present in the water resulting from run-off, pollution, turbidity, etc. Calibration is also desirable to minimize or eliminate the effects of sensor drift due to changes in ambient water temperature. As such, the controller 14 provides automatic adjustment for different water conditions, as they vary between ocean (salt water), lake or river (fresh water), and the relatively brackish conditions present in coastal areas.

The actuator 18 includes a solenoid-type valve 24 and a pneumatic member 26. The valve 24 controls the flow of compressed air from the air compressor 16 to the pneumatic member 26 via a supply line 27, and the venting of compressed air from the pneumatic member 26 via the supply line 27, as will be described more fully hereafter. Preferably, the air compressor 16 includes a tank (not shown) which serves as an accumulator or reservoir for a volume of compressed air, and the valve 24 is provided at an output of the tank.

The valve 24 is reciprocally moved from a first, open position to a second, closed position in response to signals from the controller 14 which are, in turn, in response to signals from the sensor 12. The valve 24 is preferably a three-way, normally open valve which, when in the first, open position, supplies compressed air from the air compressor 16 to the pneumatic member 26 and, when in the second, closed position, cuts-off the supply of compressed air from the air compressor 16 to the pneumatic member 26 and vents compressed air from the pneumatic member 26 to atmosphere.

The pneumatic member 26 forms a part of the throttle linkage 22 which operably interconnects the manual throttle controller 20 to a carburetor throttle valve actuator 28, and includes a piston 30, a cylinder 32, and a mounting bracket 34.

Figures 1, 2, 3:
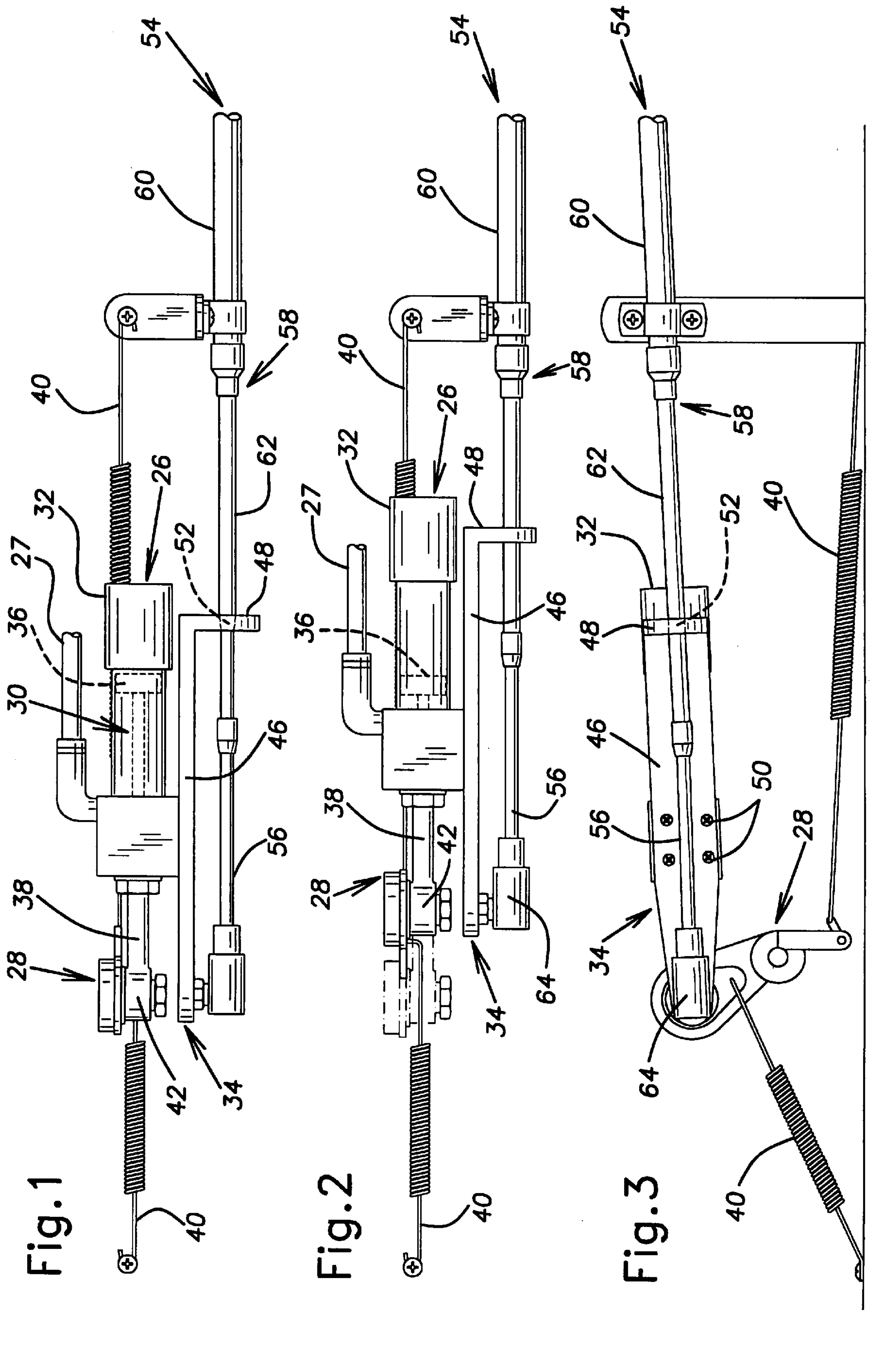
FIG. 1 is top plan view of a pneumatic member, throttle linkage rod, and carburetor throttle valve actuator according to the present invention, with the throttle valve actuator at an idle setting and the throttle linkage rod at an idle position.
FIG. 2 is a top plan view similar to FIG. 1, but with the throttle valve actuator at a full throttle setting and the throttle linkage rod at a full throttle position, the dashed lines showing the throttle valve actuator in the idle position and a piston in an extended position.
FIG. 3 is a side elevational view corresponding to FIG. 1.

The piston 30 of the pneumatic member 26 integrally includes a piston body 36 and a piston rod 38 (FIGS. 1–2). The piston body 36 is disposed within the hollow interior of the cylinder 32 and slidably moves within the cylinder 32 between a first, retracted or normal operating position (FIG. 1, and FIG. 2, full lines) and a second, extended or activated operating position (FIG. 2, dashed lines). The piston 30 is biased toward the extended position and away from the retracted position by a biasing means. In the preferred and illustrated embodiment, the biasing means comprises idle return springs 40 conventionally provided on carburetors to bias the carburetor throttle valve actuator 28 to an idle setting.

The piston 30 is maintained in the retracted position by the force of compressed air supplied to the pneumatic member cylinder 32 by the air compressor 16 via the valve 24 and supply line 27, as described hereinbefore. When compressed air is vented from the cylinder 32 due to actuation of the valve 24 by the controller 14 to the valve's second, closed position, the biasing means forces the piston 30 to move axially or lengthwise within the cylinder 32 from the retracted position to the extended position.

The piston rod 38 axially extends or projects away from the piston body 36 and outwardly through a sealed opening in the end of the cylinder 32 toward the carburetor throttle valve actuator 28. The piston rod 38 is generally coaxial with the cylinder 32 and has a distal end including a heim joint-type connector 42 which is secured by a mechanical fastener, such as a bolt, to the carburetor throttle valve actuator 28. The carburetor throttle valve actuator 28 is movably secured to the carburetor (not shown) and operably linked to a throttle valve 44, as is well known in the art. The carburetor throttle valve actuator 28 and throttle valve 44 are conventional and well known in the art and, as such, are illustrated and described in general terms, it being recognized that numerous throttle valve actuator structures are known in the art.

Figure 4:
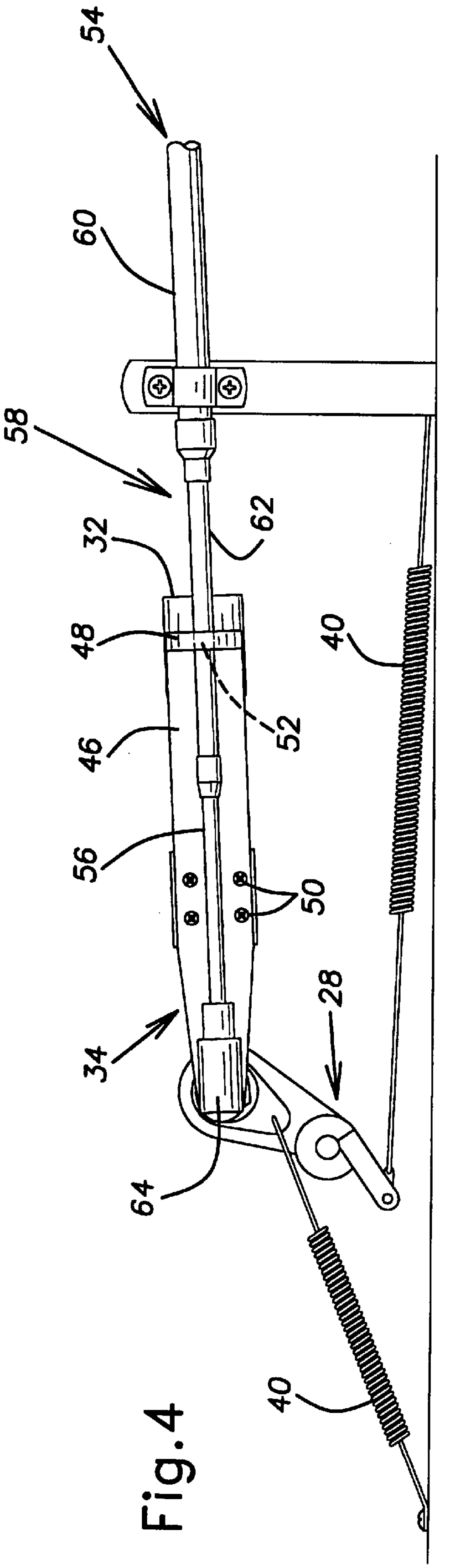
FIG. 4 is a side elevational view corresponding to FIG. 2, full lines.
Figure 5:
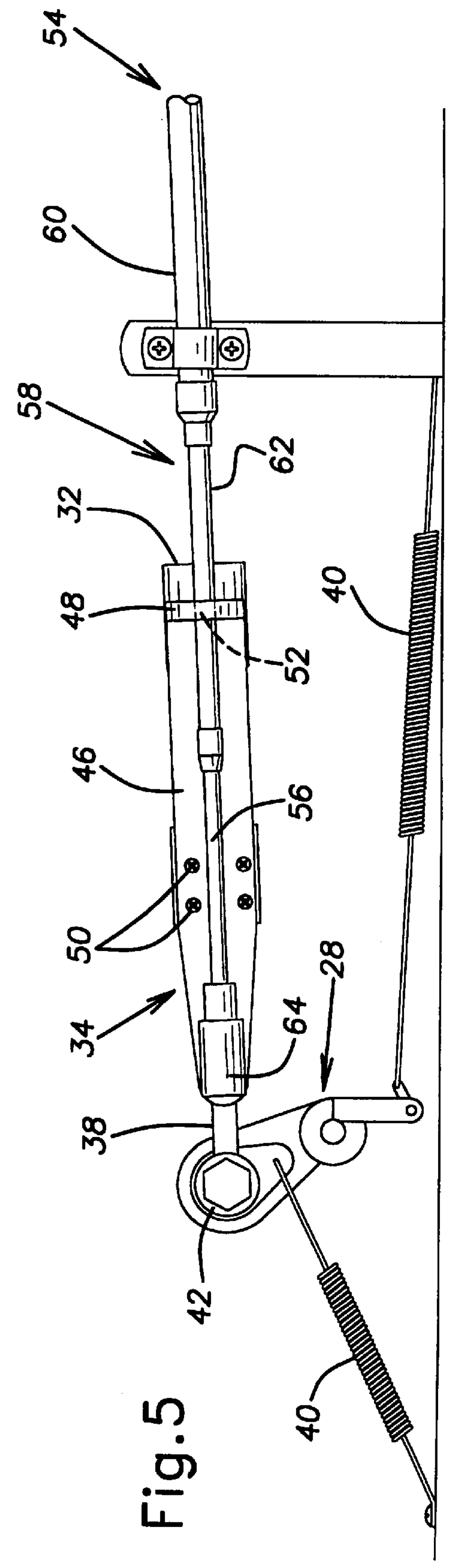
FIG. 5 is a side elevational view corresponding to FIG. 2, dashed lines.

As will be apparent from the following discussion, when the piston 30 moves from the retracted position (FIG. 1; FIG. 2, full lines) to the extended position (FIG. 2, dashed lines; FIG. 4) due to venting of compressed air from the cylinder 32 upon actuation of the valve 24 to the second, closed position by the controller 14, the piston rod 38 moves the throttle valve actuator 28, and hence the associated throttle valve 44, from a user-selected setting to the idle setting (FIG. 2, dashed lines; FIG. 5). Conversely, when the piston 30 is returned from the extended position to the retracted position due to the reintroduction of compressed air into the cylinder 32 upon actuation of the valve 24 to the first, open position by the controller 14, the piston rod 38 moves the throttle valve actuator 28 and associated throttle valve 44, from the idle setting back to the user-selected setting.

With continued reference to FIGS. 1–5, the mounting bracket 34 is generally L-shaped, having an elongated planar body 46 and a lateral extension 48. The body 46 is secured to the pneumatic member cylinder 32 by conventional mechanical fasteners, such as screws 50, to form a unitary structure. The lateral extension 48 defines an opening 52 through which a throttle linkage rod 54 extends, as will be apparent from the discussion to follow.

Since throttle linkage rod assemblies are generally custom designed for each boat type or model, the structural assembly of the throttle linkage rod 54 shown and discussed herein is only intended to be exemplary, and to describe the preferred embodiment of the present invention currently contemplated. It is contemplated that one skilled in the art could devise numerous throttle linkage rod assemblies having different structural features without departing from the scope and spirit of the invention, as defined by the claims appended hereto.

The throttle linkage 22 operably connects the manual throttle controller 20 to the carburetor throttle valve actuator 28, and includes the pneumatic member 26 and the throttle linkage rod 54. The throttle linkage rod 54 is operably connected at one end, either directly or indirectly via other conventional components or subassemblies, to the manual throttle controller 20 and, at the opposite end, to the mounting bracket 34 of the pneumatic member 26.

Operator manipulation of the manual throttle controller 20 moves the throttle linkage 22 and the throttle linkage rod 54 between a first, idle position (FIGS. 1 and 3) and a second, full throttle position (FIG. 2, full lines; FIGS. 4–5). The first, idle position corresponds to the idle setting of the carburetor throttle valve actuator 28 and the second, full throttle position corresponds to the full throttle setting of the carburetor throttle valve actuator 28.

The throttle linkage rod 54 includes an inner actuating rod 56, and a stationary outer sheath 58 radially surrounding the inner actuating rod 56 and having a first part 60 and a second part 62. The inner actuating rod 56 is slidably received within first and second sheath parts 60, 62, and extends from a distal end of the second sheath part 62 in a telescoping fashion. The inner actuating rod 56 is operably connected to the manual throttle controller 20 and is moved lengthwise by operator manipulation of the manual throttle controller 20 to any position between the idle and full throttle positions.

The first part 60 of the sheath 58 is generally formed from a flexible low-friction, wear-resistant material (i.e., plastic) and extends from adjacent the manual throttle controller 20 toward the pneumatic member 26. The second part 62 of the sheath 58 is secured to the first sheath part 60 and forms an axial extension of the first sheath part 60. However, the second sheath part 62 is formed from a rigid, low-friction, wear-resistant material, such as stainless steel.

The throttle linkage rod 54 is secured to the pneumatic member cylinder 32 by the mounting bracket 34. More specifically, a second end of the mounting bracket body 46 opposite the lateral extension 48 is secured to a terminal end of the inner actuating rod 56, as illustrated. In the preferred and illustrated embodiment, the terminal end of the inner actuating rod 56 includes a heim joint-type connector 64 which is mechanically fixed to the end of the bracket body 46 by a conventional mechanical fastener, such as a bolt.

The second sheath part 62 extends through the opening 52 in the lateral extension 48, and serves as a bearing or load-supporting member over which the lateral extension 48, and hence the pneumatic member 26, slidably travels. As described hereinbefore, the pneumatic member 26 is secured to the actuating rod 56 and, therefore, travels back and forth in a reciprocating manner over the second sheath part 62 as the actuating rod 56 is moved back and forth relative to the sheath 58 between the idle and full throttle positions, as illustrated. The pneumatic member cylinder 32 has an axis which is generally parallel to the axis of the throttle linkage rod 54, but in the illustrated and preferred embodiment is displaced laterally therefrom. The lateral extension 48 serves as a guide to prevent twisting of the pneumatic member 26 and throttle linkage rod 54 relative to one another.

During normal operation, the pneumatic member piston 30 is maintained in its retracted position by the force of compressed air in the cylinder 32. Accordingly, when the manual throttle controller 20 is adjusted or manipulated by the operator to change the user-selected throttle position, the pneumatic member 26 and piston 30 move axially with the actuating rod 56 and, in turn, move the carburetor throttle valve actuator 28 to adjust the carburetor throttle valve 44 to a new user-selected setting and thereby control the operating speed of the boat engine.

Figure 7:
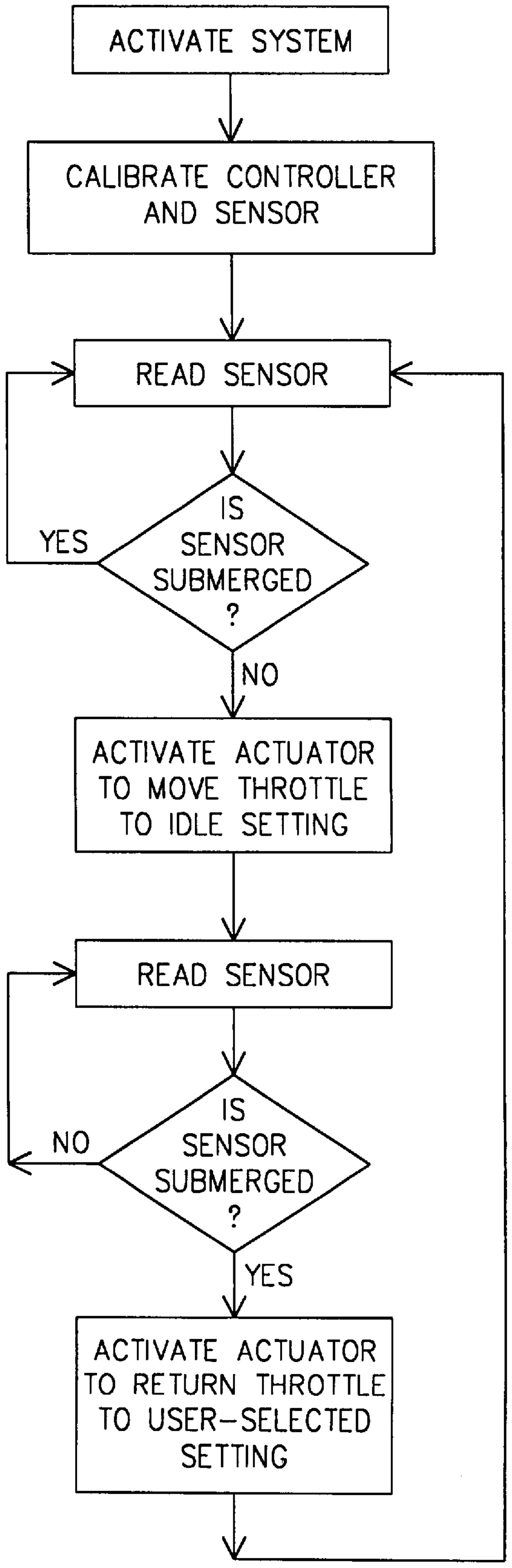
FIG. 7 is a flow chart illustrating the operational steps of an automatic adjustor system according to the present invention.

The general operating sequence of the system 10 according to the present invention is illustrated in the flow chart of FIG. 7, and described hereafter with reference to FIGS. 1–6.

As will be readily apparent, when the boat is operating under normal conditions (i.e., the sensor 12 is sending a current signal to the controller 14 indicative of the sensor 12 being submerged in water), the automatic throttle adjustor system 10 according to the present invention does not affect manual adjustment of the engine throttle by the operator. Rather, under such normal operating conditions, the pneumatic member 26 serves as a static portion of the throttle linkage 22. The pneumatic member cylinder 32 is supplied with compressed air from the air compressor 16 via the valve 24, which is in its first, open position, and the pneumatic member piston 30 is maintained in its retracted position.

The operator's manipulation of the manual throttle controller 20 to change the user-selected throttle position is communicated via the throttle linkage 22 (i.e., the throttle linkage rod 54 and pneumatic member 26) to the carburetor throttle valve actuator 28 to correspondingly change the user-selected throttle setting. The manual throttle controller 20 and throttle linkage 22 are movable to any position between the idle position (FIGS. 1 and 3) and the full throttle position (FIG. 2, full lines; FIG. 4), and correspondingly move the throttle valve actuator 28 to a like setting between the idle setting and the full throttle settings. Accordingly, there is a one-to-one correspondence between the user-selected throttle position (at the manual throttle controller 20) and the user-selected throttle setting (at the throttle valve 44 and throttle valve actuator 28) when the system 10 is operated under normal conditions. As such, the inclusion or incorporation of the present invention is transparent to the operator under normal operating conditions.

When the sensor 12 sends the predetermined signal to the controller 14 indicative of the sensor 12 being out of the water, the controller 14 activates the valve 24 to move from the first, open position to the second, closed position. The supply of compressed air to the pneumatic member cylinder 32 from the air compressor 16 is cut-off, and compressed air within the cylinder 32 is vented to atmosphere. Venting of compressed air from the cylinder 32 is almost instantaneous, and causes the piston 30 to move under the influence of the biasing means to the extended position. Movement of the piston 30 to the extended position returns the carburetor throttle valve actuator 28 to the idle setting (FIG. 2, dashed lines; FIG. 5).

During movement of the piston 30 to the extended position, the pneumatic member cylinder 32 and throttle linkage rod 54 remain stationary. Therefore the position of the manual throttle controller 20 is unaffected by the activation of the actuator 18, and the operation of the automatic throttle adjustor system 10 is transparent to the user, except insofar as the return of the engine to idling speed may be noticed by the operator.

When the sensor 12 is again submerged, the sensor 12 sends a signal (i.e., at the first value) to the controller 14 which causes the controller 14 to deactivate the actuator 18. The valve 24 is returned from the second, closed position to the first, open position, resulting in compressed air being again supplied to the cylinder 32 to return the piston 30 from the extended position to the retracted position. Movement of the piston 30 to the retracted position returns the carburetor throttle valve actuator 28 from the idle setting to the user-selected setting.

During operation of a boat incorporating the present invention, the actuator 18 may cycle between activated and deactivated states a number of times. The operation of the system 10 is quite rapid, and may complete an activation-deactivation cycle in much less than a second and, typically, in less than a hundredth of a second.

The system 10 is operated in the deactivated or normal state a vast majority of the time, and is only activated upon sensing that the sensor 12 has become airborne. During tests on a boat having a prototype of the present invention, it was found that the operator could not detect activation and deactivation of the automatic throttle adjustor system 10 because of the rapidity of the switching back and forth between the activated and deactivated states. These tests also revealed that the performance of the boat was markedly improved.

Generally, with the limited chance of the propulsion screw leaving the water, the operator was able to operate the boat at higher speeds than would otherwise have been prudent. Therefore, it is believed that the incorporation of the present invention on high-performance power boats, such as race boats (i.e., cigarette boats), may be of great benefit.

As used herein, the piston's second, extended or "activated" position is intended to describe a position in which the carburetor throttle valve actuator 28 is returned to the idle setting, and to describe a position displaced from the retracted position. The exact location of the piston 30 within the cylinder 32 when the piston 30 is in the second, extended or "activated" position will vary depending upon the position of the manual throttle controller 20 when the pneumatic member 26 is activated.

For example, one skilled in the art will appreciate that, if the manual throttle controller 20 is at full throttle when the actuator 18 is activated to move the piston 30 to the extended position, the piston 30 will have to move a greater distance to return the throttle valve 44 to the idle setting than if the manual throttle controller 20 was at a half throttle position when the actuator 18 was activated. If the manual throttle is at a less than full throttle position when the actuator 18 is activated, the piston 30 will only move partway of the length of the cylinder 32 to reach the second, extended position, and the carburetor throttle valve actuator 28 will engage the idle stops which are conventionally provided on carburetors. Therefore, no adjustment of the pneumatic member 26 is necessary or required to compensate for different settings of the manual throttle controller 20.

The automatic throttle adjustor system 10 according to the present invention is adapted for incorporation into existing boats. Generally, the sensor 12 is mounted to the bottom of the boat at a predetermined location, the controller 14 is mounted adjacent a dashboard or control panel accessible to the operator, the air compressor 16 and valve 24 are located adjacent the engine, and the pneumatic member 26 is secured to the throttle linkage rod 54.

More specifically, the existing throttle linkage rod 54, which typically includes the sheath first part 60 and the actuating rod 56, is unattached from the carburetor throttle valve actuator 28, and modified as necessary to the form of the above-described throttle linkage rod 54. Typically, this entails removing a portion of the first sheath part 60 and adding the second sheath part 62 thereto as an extension of the first sheath part 60. The throttle linkage rod 54 is slidably inserted through the opening 52 in the lateral extension 48 of the mounting bracket 34, and the terminal end of the actuating rod 56 is secured to the opposite end of the mounting bracket body 34. Thereafter, with the manual throttle controller 20 in the idle position and the piston 30 in the retracted position, the distal end of the piston rod 38 is secured to the throttle valve actuator 28.

While the preferred embodiment of the present invention is shown and described herein, it is to be understood that the same is not so limited but shall cover and include any and all modifications thereof which fall within the purview of the invention. For example, it is contemplated that the present invention may be used with equal functionality on boats having plural manual throttle controllers (i.e., a hand-operated manual throttle controller and a foot-pedal operated manual throttle controller). On such boats, one throttle linkage rod will be attached as illustrated and discussed above. The other throttle linkage rod could be attached to the mounting bracket lateral extension 48, or a similar supplementary structure, by conventional mechanical means, such as a weld or fastener.

What is claimed is:

1. An automatic throttle control system for a power boat having a propulsion screw, comprising:

a sensor, said sensor being mounted to a lower surface of the boat relatively forward of the propulsion screw and being operable to sense whether the boat surface is submerged;

a carburetor throttle valve actuator mounted to a carburetor and operably connected to a throttle valve, said throttle valve actuator being movable to any one of a plurality of user-selected settings between an idle setting and a full-throttle setting;

an actuator operable to return said carburetor throttle valve actuator from said user-selected setting to said idle setting; and, a controller which receives a signal from said sensor and, when said signal is at a first predetermined value indicative of the sensor being out of the water, activates the actuator to move the carburetor throttle valve actuator from said user-selected setting to said idle setting and, wherein after said actuator has been activated to move said carburetor throttle valve actuator to said idle setting and said signal is at a second predetermined value indicative of said sensor being submerged, said controller activates the actuator to return the carburetor throttle valve actuator to said user-selected setting.

2. An automatic throttle control system according to claim 1, further comprising a manual throttle controller and a throttle linkage, said manual throttle controller being movable by an operator to a user-selected position between an idle position and a full-throttle position, said manual throttle controller being operatively linked to said carburetor throttle valve actuator by said throttle linkage, wherein movement of said manual throttle controller to said user-selected position is transferred to said carburetor throttle valve actuator by said throttle linkage to place said carburetor throttle valve actuator in said user-selected setting, there being a one-to-one correspondence between said user-selected position and said user-selected setting.

3. An automatic throttle control system according to claim 2, wherein the throttle linkage comprises a throttle linkage rod and a pneumatic member.

4. An automatic throttle control system according to claim 3, wherein the throttle linkage rod includes a first, movable part and a second, stationary part, said pneumatic member being fixed to said first part and movable relative to said second part.

5. An automatic throttle control system according to claim 4, wherein said pneumatic member includes a piston, a cylinder, and a mounting bracket.

6. An automatic throttle control system according to claim 5, wherein said mounting bracket is secured to said cylinder and defines an opening through which said second part passes, said mounting bracket being slidably supported by said second part.

7. An automatic throttle control system according to claim 5, wherein said piston is secured to said throttle valve actuator.

8. An automatic throttle control system according to claim 7, wherein said piston is movable from a retracted position to an extended position to move said throttle valve actuator from said user-selected setting to said idle setting.

9. An automatic throttle control system according to claim 8, wherein said manual throttle controller remains in said user-selected position when said piston is moved from said retracted position to said extended position.

10. An automatic throttle control system according to claim 1, further comprising an air compressor which is adapted to supply compressed air to said actuator.

11. An automatic throttle control system according to claim 10, wherein said actuator includes a valve and a pneumatic member, said valve being in communication with said air compressor and said pneumatic member and operable to control flow of compressed air between said air compressor and said pneumatic member.

12. An automatic throttle control system according to claim 11, wherein said valve is movable from a first position communicating compressed air from said air compressor to said pneumatic member to a second position cutting-off compressed air from said air compressor to said pneumatic member and venting compressed air from said pneumatic member.

13. An automatic throttle control system according to claim 12, wherein said pneumatic member includes a piston and a cylinder, said piston being movable between a retracted position and an extended position.

14. An automatic throttle control system according to claim 13, wherein said piston is in said retracted position when said valve is in said first position and is moved to said extended position when said valve is moved to said second position.

15. A method for automatically adjusting a throttle of a power boat, said power boat having a propulsion screw rotatably driven by an engine, a sensor mounted to a lower surface of said boat relatively forwardly of said propulsion screw when viewed in a direction of travel, a carburetor throttle valve actuator mounted to a carburetor of said engine and operably linked to a throttle valve, said carburetor throttle valve being movable to any one of a plurality of settings between an idle setting and a full throttle setting, and a controller, comprising the sequential steps of:

a. supplying signals from said sensor to s aid control device;

b. interpreting said signals to determine whether said sensor is submerged;

c. if said sensor is submerged, returning to step (a);

d. if said sensor is not submerged, returning the carburetor throttle valve to the idle position;

e. interpreting said signals to determine whether said sensor is submerged;

f. if said sensor is submerged, returning the carburetor throttle valve to the user-selected position and returning to step (a); or, g. if the sensor is not submerged, returning to step (e).

* * * * *